United States Patent
Roty et al.

(10) Patent No.: US 9,108,375 B2
(45) Date of Patent: Aug. 18, 2015

(54) MOLD FOR VULCANIZING A TIRE TREAD, COMPRISING AT LEAST ONE ADDED ELEMENT IN A CORD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (FR)

(72) Inventors: Gael Roty, Clermont-Ferrand (FR); Bernard Villeneuve, Clermont-Ferrand (FR); Philippe Souyri, Clermont-Ferrand (FR)

(73) Assignees: COMPAGNIE GENERAL DES ETABLISSEMENTS MICHELIN, Clermont-Ferrand (FR); MICHELIN RECHERCHE ET TECHNIQUE, Granges-Paccot (CH)

( * ) Notice: Subject to any disclaimer, the term of this patent is extended or adjusted under 35 U.S.C. 154(b) by 0 days.

(21) Appl. No.: 14/378,264

(22) PCT Filed: Feb. 8, 2013

(86) PCT No.: PCT/EP2013/052565
§ 371 (c)(1),
(2) Date: Aug. 12, 2014

(87) PCT Pub. No.: WO2013/120783
PCT Pub. Date: Aug. 22, 2013

(65) Prior Publication Data
US 2015/0004269 A1  Jan. 1, 2015

(30) Foreign Application Priority Data
Feb. 13, 2012 (FR) .................................. 12 51315

(51) Int. Cl.
*B29D 30/06* (2006.01)
*B60C 11/04* (2006.01)

(52) U.S. Cl.
CPC .......... *B29D 30/0606* (2013.01); *B60C 11/042* (2013.04); *B29D 2030/0609* (2013.01); *B29D 2030/0612* (2013.01); *B29K 2827/18* (2013.01)

(58) Field of Classification Search
CPC ................... B29D 30/0606; B29D 2030/0609; B29D 2030/0612
See application file for complete search history.

(56) References Cited

U.S. PATENT DOCUMENTS 4,740,145 A   4/1988  Shurman
5,800,642 A *  9/1998  Ohya ........................... 425/28.1
(Continued)

FOREIGN PATENT DOCUMENTS

EP   908330   4/1999
EP   2078623  7/2009
(Continued)

OTHER PUBLICATIONS

International Search Report for PCT/EP2013/052565 dated Jul. 5, 2013.

*Primary Examiner* — James Mackey
(74) *Attorney, Agent, or Firm* — Dickinson Wright PLLC

(57) ABSTRACT

A mold for vulcanizing a tire tread comprising a molding surface able to mold a tread surface of the tread of the tire and at least one bar of length L and of width W able to mold a groove in the tread. The bar comprises two lateral faces extending along the length of the bar and projecting from the molding surface and an upper face connecting the said lateral faces. The mold comprises in the bar at least two cavities respectively opening onto the two lateral faces of the bar without opening onto the upper face of this bar. These cavities overlap in the width of the bar. The mold further comprises a first element added into the bar beforehand, this first element separating the two cavities in the length of the bar.

8 Claims, 4 Drawing Sheets

(56) References Cited

U.S. PATENT DOCUMENTS

| | | |
|---|---|---|
| 6,119,744 A | 9/2000 | Tsukagoshi |
| 8,506,275 B2 * | 8/2013 | Villeneuve et al. .......... 425/28.1 |
| 2009/0194213 A1 | 8/2009 | Suzuki |
| 2012/0114777 A1 | 5/2012 | Villeneuve |

FOREIGN PATENT DOCUMENTS

| | | |
|---|---|---|
| FR | 2946915 | 12/2010 |
| JP | 62004610 | 1/1987 |
| JP | 2002234313 | 8/2002 |
| JP | 2007210569 | 8/2007 |

* cited by examiner

MOLD FOR VULCANIZING A TIRE TREAD, COMPRISING AT LEAST ONE ADDED ELEMENT IN A CORD

This application is a 371 national phase entry of PCT/EP2013/052565, filed 8 Feb. 2013, which claims benefit of FR 1251315, filed 13 Feb. 2012, the entire contents of which are incorporated herein by reference for all purposes.

BACKGROUND

1. Field

The present disclosure relates to the field of the manufacture of a mold for a tire comprising a plurality of cavities which are able to mold closure devices in one or more groove(s) of this tire. More particularly, the disclosure relates to the manufacture of a mold able to mold closure devices fixed to the lateral walls of the grooves.

2. Description of Related Art

Document WO 2010146180 discloses a vulcanizing mold for a tire comprising a plurality of molding elements. Each molding element is delimited by two edges in contact with two other adjacent molding elements so that once the molding elements are in contact with one another, all of these molding elements together allow all or part of the tread of the tire to be molded.

Each molding element comprises a base and a bar projecting from this base. The base is intended to mold the tread surface of the tread of the tire and the bar is intended to mold a groove in the tread of this tire, i.e. a cut of a width greater than or equal to 2 mm.

It is known that, in the contact patch in which the tread is in contact with the road surface, each groove forms a resonance tube with this road surface. This resonance tube amplifies the running noise of the tire, and this may be unpleasant for people situated inside the vehicle and/or outside this vehicle.

In order to limit the intensity of this resonant noise, it is known practice to provide the grooves with special closure devices also referred to as "flexible walls", or "flaps". These closure devices take the form of thin blades. These blades partially close off the cross section of the grooves when the tire is running on a dry road surface. When it is running on a wet road surface, the blades flex under the action of the flow of water, so that this water can be removed from the contact patch. The grip of the tire on the road surface is thus maintained even when running under severe wet conditions.

There are various types of devices for closing a groove. For example, document WO 2010063749 discloses closure devices which are fixed by their base to a bottom of a groove. It has been found that the flexibility of these devices changes over time. Thus, with tire wear, the height of these closure devices decreases, thus causing their rigidity to increase. These closure devices may therefore ultimately prevent water from circulating properly in the groove.

In order to improve the operation of the closure devices on a wet road surface, document FR2715891 has proposed closing the cross section of the groove using two closure devices belonging to one and the same transverse plane and each one covering approximately half the cross section of this groove. These closure devices are fixed respectively to lateral walls of the groove and not to the bottom of this groove. Thus, with tread wear, the region of attachment of each closure device to the associated wall of the groove decreases. The flexibility of the closure device is maintained over time, or even increased, until a certain degree of tread wear is reached.

However, in order to mold these closure devices into a groove, it is necessary to make slots in the lateral faces of a bar of a mold, it not being appropriate for these slots to open onto the upper surface of this bar. Now, creating these slots with the required degree of precision is accompanied by a great many difficulties.

FIG. 1 schematically depicts a perspective view of a known embodiment of a molding element 1 that can be used for molding a closure device fixed to a lateral wall of a groove.

The molding element 1 comprises a base 3 and a bar 5 projecting from the said base 3. The base 3 and the bar 5 are in this instance formed as one from the same substance and made of a material of the aluminium type.

More particularly, the base 3 comprises a molding surface 7 intended to mold part of the tread surface of a tire. The bar 5 for its part comprises an upper face 9 intended to mold the bottom of a groove and two lateral faces 11, just one of which is depicted here. These lateral faces 11 project from the molding surface 7 of the base 3 and extend along the length of the bar.

More specifically, the bar 5 comprises a recess 15. This recess is intended to accept raw rubber for molding a closure device in a groove of a tire. The recess 15 in this instance opens onto one of the lateral faces 11 of the bar 5 and onto a contact edge 17 of the molding element 1. By contrast, the recess 15 does not open onto the upper face 9 of the bar 5.

FIG. 2 shows an assembly of two molding elements 32a, 32b according to the embodiment of FIG. 1. More specifically, FIG. 2 is a view in cross section of this assembly on a plane substantially parallel to the molding surfaces 39a, 39b of the molding elements 1a, 1b.

Assembling the two molding elements 32a, 32b forms two cavities 33a, 33b which are offset from one another along the length of the bar 35, each cavity 33a, 33b opening respectively onto one of the lateral faces 37a, 37b of this bar 35. More specifically, each cavity 33a, 33b is formed by a recess belonging to one of the two molding elements 32a, 32b, this recess being delimited by a contact edge belonging to the other molding element 32a, 32b.

Now, such an assembly limits the design options for the closure devices. This is because with the assembly of FIG. 2, it is not possible to mold closure devices which are offset along the length of the bar and exhibit a certain overlap ("overlapping") as is notably depicted in document JP3276802, in FIG. 10 (A).

SUMMARY

It is therefore an object of the embodiments of the invention to make it easier to manufacture a mold capable of molding into a tire tread at least one pair of closure devices that are attached to lateral walls of a groove, these closure devices being spaced apart from one another and overlapping.

DEFINITIONS

A "tire" means all types of resilient tread whether or not it is subjected to an internal pressure.

The "tread" of a tire means a quantity of rubber material delimited by lateral surfaces and by two main surfaces one of which is intended to come into contact with a road surface when the tire is being driven on.

A "tread surface" means the surface formed by those points of the tread of the tire that come into contact with the road surface when the tire is being driven on.

A "mold" means a collection of separate molding elements which, when brought relatively closer together, make it possible to delimit a toroidal molding space.

A "molding element" means part of a mold. A molding element is, for example, a mold segment.

A "base" means that part of the molding element that comprises a molding surface able to mold the tread surface of the tread of the tire. The base notably comprises attachment means intended to attach the molding element to the rest of the mold.

A "bar" means a protuberance projecting from the base and of a width greater than or equal to 2 mm. The bar is intended to mold a groove in the tread of the tire.

A "cavity" in a mold means a hollow volume delimited by walls of the mold. This cavity is able to mold a closure device in a groove molded by a bar.

A "recess" in a bar means a hollow in the bar that opens onto a contact edge of the molding element. This recess is able to be closed at the contact edge of this molding element by another molding element with a view to forming a cavity.

A "contact edge" of a molding element means a surface of the molding element that is intended to come into contact with another molding element to form all or part of a vulcanizing mold.

The invention, in an embodiment, relates to a mold for vulcanizing a tire tread, the said mold comprising a molding surface able to mold a tread surface of the tread of the tire and at least one bar of length L and of width W able to mold a groove in the tread, the said bar comprising two lateral faces extending along the length of the bar and projecting from the molding surface and an upper face connecting the said lateral faces, the said mold comprising in the bar at least two cavities respectively opening onto the two lateral faces of the bar without opening onto the upper face of this bar, the said cavities overlapping in the width of the bar. The mold comprises a first element added into the bar beforehand, this first element separating the two cavities in the length of the bar.

Thus, by virtue of the added element, it is possible to mold a pair of closure devices which are attached to lateral walls of a groove, these closure devices being spaced apart from one another along the length of the bar and overlapping.

In an alternative form of embodiment, the first element is covered with a non-stick material such as xylane.

This then makes the closure devices molded by the two cavities of the mold easier to demold.

In a preferred embodiment, the first element comprises polytetrafluoroethylene.

This then makes the closure devices molded by the two cavities of the mold even easier to demold.

In an alternative form of embodiment, the mold comprises a second element added into the bar in contact with the first element, the said second element partially delimiting one of the two cavities, the first element and the second element forming all or part of an insert.

In an alternative form of embodiment, the insert comprises fixing means able to hold the first element in contact with the second element.

Thus, good contact between the first element and the second element is insured, thereby limiting the presence of gaps between these two elements. This then prevents rubber from migrating into these gaps during molding and therefore prevents the creation of unattractive flash in the grooves of the molded tire.

In an alternative form of embodiment, the insert comprises means for discharging air from the cavity delimited by the first element and the second element.

In an alternative form of embodiment, the first element completely delimits a third cavity, the said third cavity opening onto the upper face of the bar, the said third cavity not opening onto either one of the lateral faces of the bar.

The invention therefore allows ease of molding of three closure devices spaced apart from one another along the length of the bar and overlapping. This is particularly advantageous when the cross section of the groove is of great width, for example more than 15 mm wide. With such a groove width, the use of just two closure devices respectively attached to two opposite lateral walls of the groove and having in a transverse direction a dimension greater than half the width of this groove may present problems in terms of durability. This is because the movements of the closure devices which are brought about by alternating driving on dry road surfaces and on wet road surfaces may generate stress concentrations at the base of each closure device. There is therefore ultimately a risk of cracks appearing at these bases. By providing a third closure device arranged between the first closure device and the second closure device the transverse dimension of this first closure device and of this second closure device is reduced. The stresses that these two closure devices have to withstand are therefore lower and they therefore work better over time.

Another subject of the invention is a tread of a tire which is molded and vulcanized using the mold as described hereinabove.

BRIEF DESCRIPTION OF THE DRAWINGS

Other features and advantages of embodiments of the invention will become apparent from the following description, given by way of nonlimiting example, with reference to the attached drawings in which.

DETAILED DESCRIPTION OF SPECIFIC EMBODIMENTS

In the description which follows, elements which are substantially identical or similar will be denoted by identical references.

Figure 1:
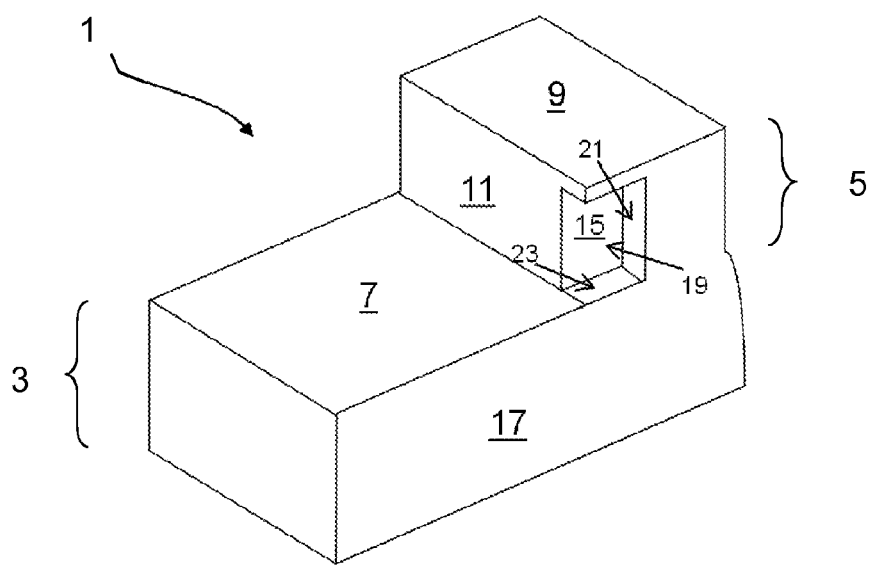
FIG. 1 schematically depicts a partial perspective view of a molding element known from the prior art.
Figure 2:
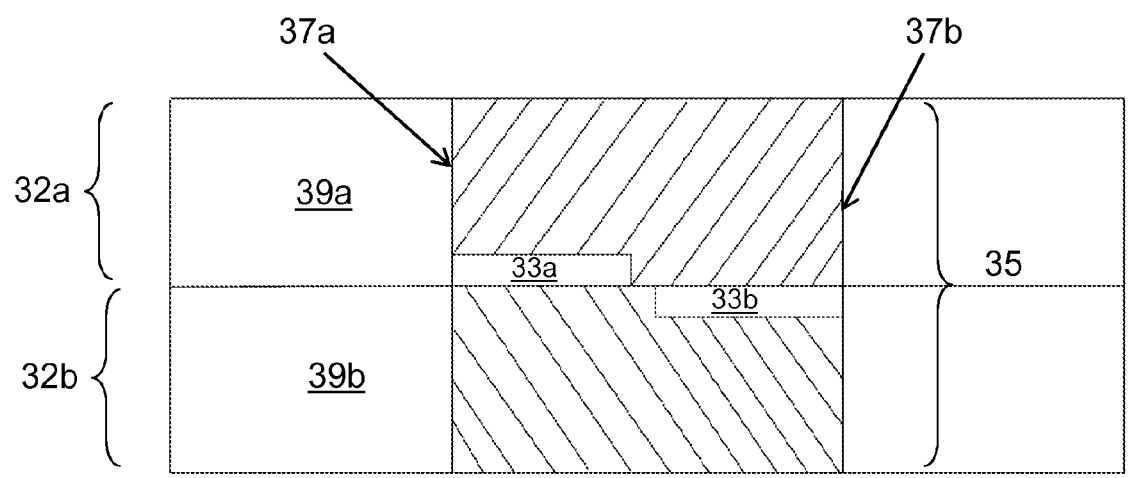
FIG. 2 depicts a view in cross section of two molding elements according to the prior art of FIG. 1, these two molding elements being assembled to form two molding cavities, these molding cavities being offset along the length of the bar.
Figure 3:
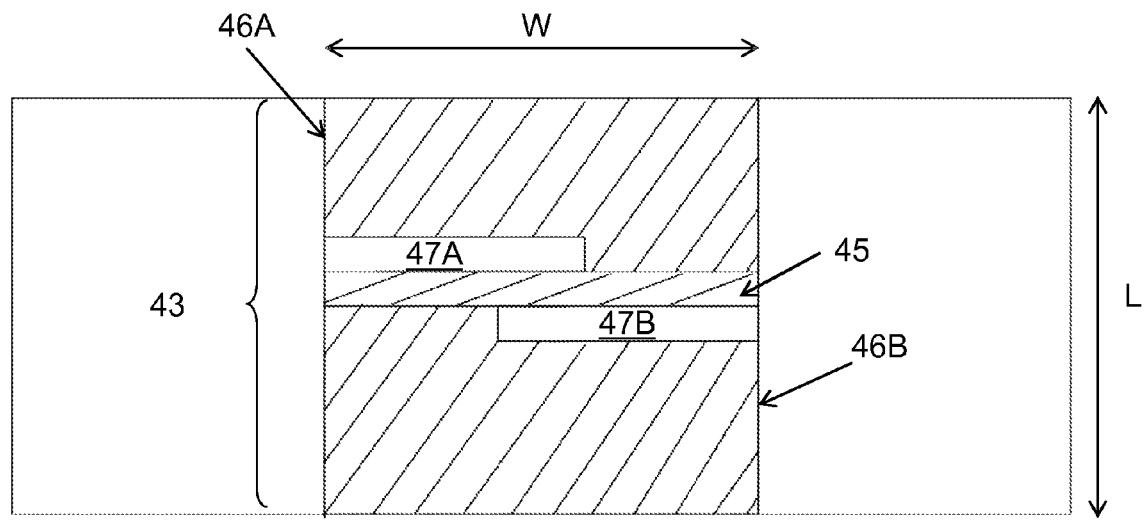
FIG. 3 depicts a view in cross section of a mold comprising a first added element, according to a first embodiment of the invention.

FIG. 3 depicts a view in cross section of a mold 41 comprising in a bar 43 a first added element 45 extending across the entire width W of the bar.

More specifically, the added element 45 separates two molding cavities 47A, 47B which are intended to mold closure devices in a tread of a tire. These molding cavities open respectively onto two lateral faces 46A, 46B of the bar without opening onto the upper face of this bar (which face is not depicted here). These two cavities 47A, 47B overlap in the width W of the bar.

The molding cavities 47A, 47B are therefore delimited by the added element 45 and by the bar 43.

Figure 4:
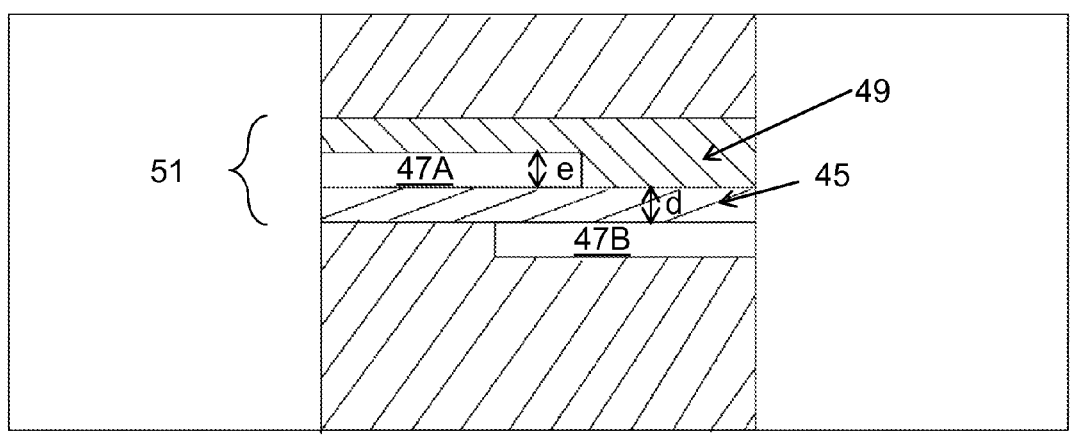
FIG. 4 depicts a view in cross section of a mold comprising a second added element, according to a second embodiment of the invention.

FIG. 4 depicts an alternative form of embodiment in which one of the molding cavities 47A is delimited by the first element 45 and by an added second element 49. The assembly made up of the first element 45 and the second element 49 forms an insert 51. By suitably dimensioning the first element 45 and the second element 49 it is possible to adjust the thickness e of the molding cavity and the distance d separating the two molding cavities 47A, 47B.

Figure 5:
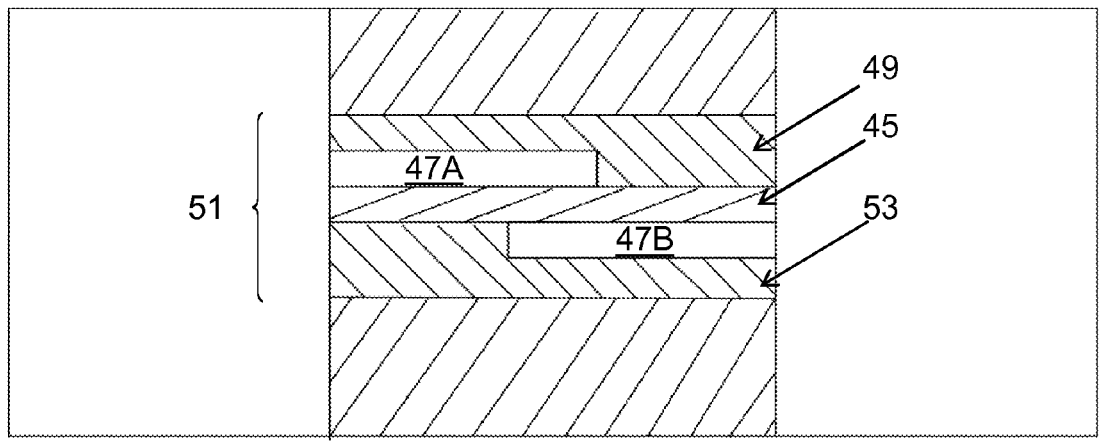
FIG. 5 depicts a view in cross section of a mold comprising a third added element, according to a third embodiment of the invention.

FIG. 5 shows another alternative form of embodiment in which the insert 51 comprises three added elements 45, 49, 53. These three added elements delimit the two molding cavities 47A, 47B.

Figure 6:
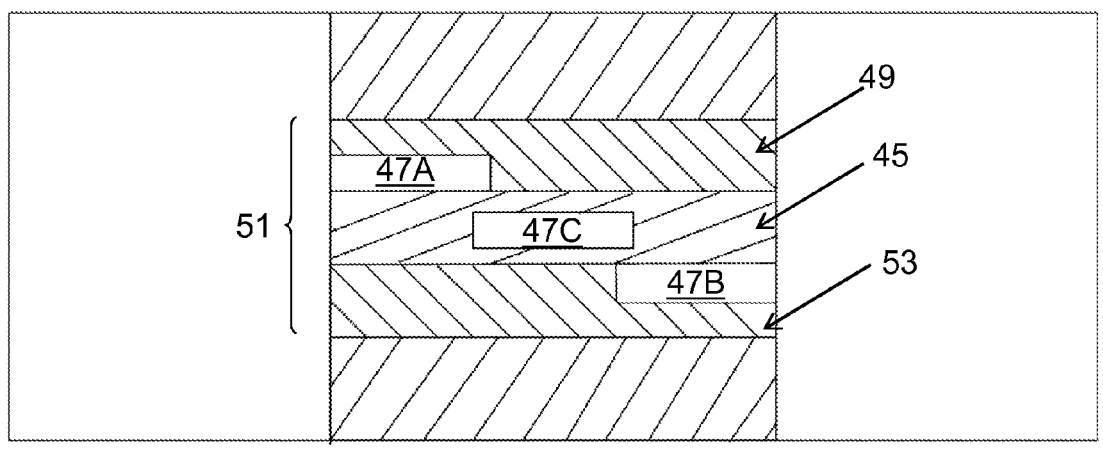
FIG. 6 depicts a view in cross section of a mold according to a fourth embodiment.

FIG. 6 shows another alternative form in which the insert 51 is able to mold three molding cavities 47A, 47B, 47C. The third cavity 47C opens onto the upper face of the bar. This third cavity 47C does not open onto either one of the lateral faces of the bar.

The first element 45 is shown here as a single part. As an alternative, the first element 45 may comprise several parts delimiting the third cavity 47C.

It will be noted that in the various embodiments, the added elements 45, 49, 53 may be covered with a non-stick material such as xylane.

In one preferred embodiment, the added elements 45, 49, 53 comprise polytetrafluoroethylene.

Figure 7:
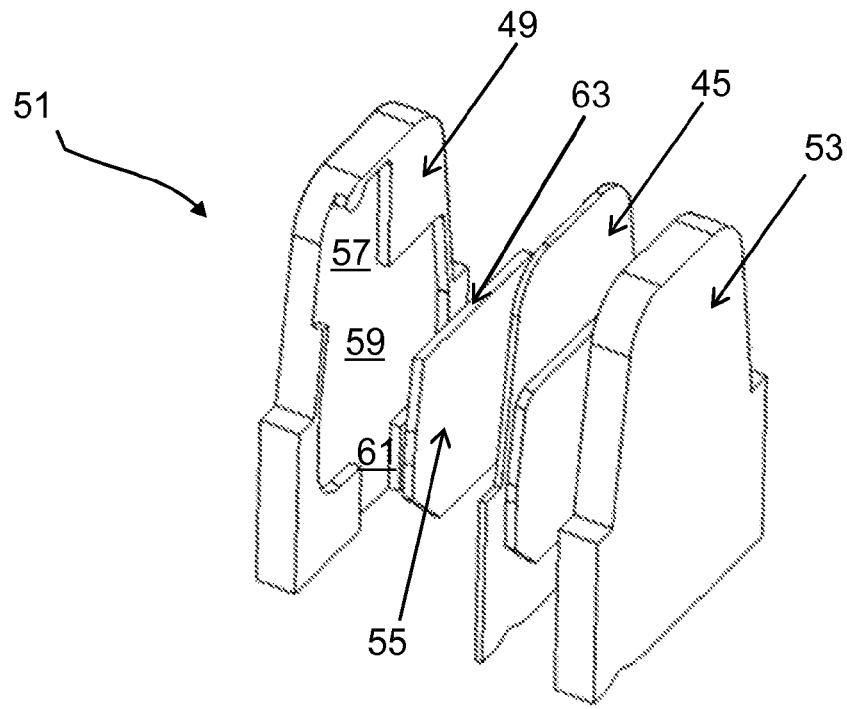
FIG. 7 depicts an exploded perspective view of an insert formed by the assembly of the added elements of FIG. 5, according to a first mode of assembly.

FIG. 7 shows an exploded perspective view of the insert 51 of FIG. 5 according to a first mode of assembly. As has already been specified, the insert 51 comprises three added elements 45, 49, 53.

More specifically, the second added element 49 comprises three recesses 57, 59, 61. The first recess 57 is intended to form one of the two molding cavities 47A, 47B. The second recess 59 is intended to accept an intermediate element 55. The intermediate element 55 comprises a molding surface 63. This molding surface 63 is intended to mold the upper part of the closure device molded by the molding cavity 47A, 47B. The third recess 61 forms an air discharge duct to ensure that air is discharged from the mold when, during molding, the rubber material enters the first recess 57. It will be noted that the thickness of the intermediate element 55 is very slightly smaller than the depth of the recess 59. There is therefore a space between the intermediate element 55 and the first added element 45, so that air can pass towards the discharge duct 61.

Figure 8:
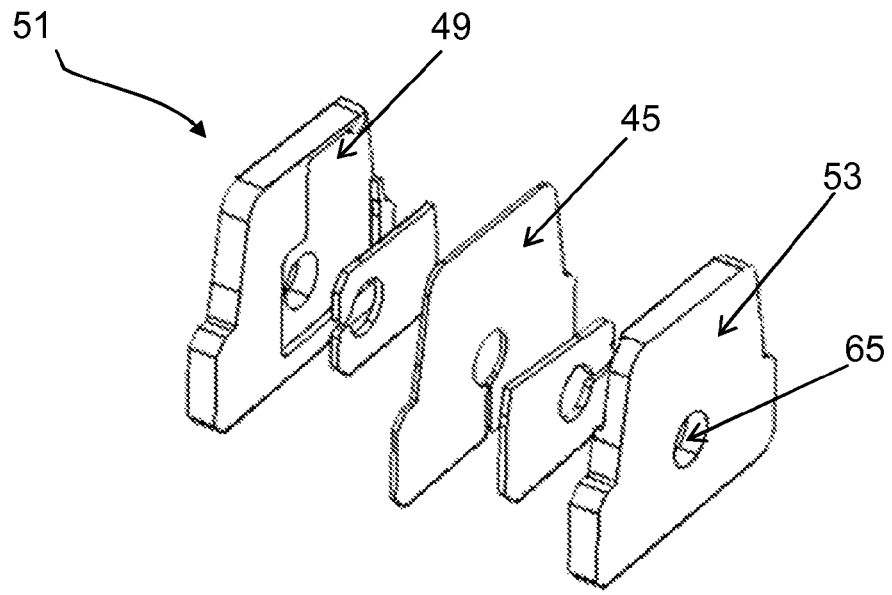
FIG. 8 depicts an exploded perspective view of an insert formed by the assembly of the added elements of FIG. 5, according to a second mode of assembly.

FIG. 8 shows an exploded perspective view of the insert 51 of FIG. 5 according to a second mode of assembly. In this mode of assembly, air is discharged via an orifice 65 present in each of the elements 45, 49, 53 that make up the insert 51. In addition to allowing air to pass, this orifice 65 allows the passage of fixing means such as a screw. These fixing means allow the various elements 45, 49, 53 of the insert 51 to be fixed together.

The invention also covers tires molded by a mold as described hereinabove. These tires may be any type of tire comprising closure devices in grooves, such as tires for passenger vehicles, tires for heavy vehicles, etc.

The invention is not restricted to the embodiments described and depicted and various modifications can be made thereto without departing from its scope.

The invention claimed is:

1. A mold for vulcanizing a tire tread, the mold comprising:
    a molding surface able to mold a tread surface of the tread of the tire, and
    at least one bar of length L and of width W able to mold a groove in the tread, the bar comprising:
        two lateral faces extending along the length of the bar and projecting from the molding surface,
        an upper face connecting the lateral faces,
        at least two cavities respectively opening onto the two lateral faces of the bar without opening onto the upper face of the bar, the cavities overlapping in the width of the bar, and
        a first element added into the bar beforehand, this first element separating the two cavities in the length of the bar.

2. The mold according to claim 1, wherein the first element is covered with a non-stick material.

3. The mold according to claim 1, wherein the first element comprises polytetrafluoroethylene.

4. The mold according to claim 1, wherein the mold further comprises a second element added into the bar in contact with the first element, wherein the second element partially delimits one of the two cavities, and wherein the first element and the second element form all or part of an insert.

5. The mold according to claim 4, wherein the insert comprises fixing means able to hold the first element in contact with the second element.

6. The mold according to claim 4, wherein the insert comprises means for discharging air from the cavity delimited by the first element and the second element.

7. The mold according to claim 1, wherein the first element completely delimits a third cavity, wherein the third cavity opens onto the upper face of the bar, and wherein the third cavity does not open onto either one of the lateral faces of the bar.

8. The mold according to claim 2, wherein the non-stick material comprises xylane.

* * * * *